United States Patent [19]

Kubo et al.

[11] Patent Number: 4,733,580
[45] Date of Patent: Mar. 29, 1988

[54] METHOD OF CONTROLLING A TRANSMISSION OF A VEHICLE IN TWO DIFFERENT MODES ACCORDING TO REQUIREMENTS FOR POWER AND ECONOMY

[75] Inventors: Seitoku Kubo; Yutaka Taga; Shinya Nakamura; Hideki Yasue, all of Toyota, Japan

[73] Assignee: Toyota Jidosha Kabushiki Kaisha, Toyota, Japan

[21] Appl. No.: 764,175

[22] Filed: Aug. 9, 1985

[30] Foreign Application Priority Data

| Aug. 10, 1984 | [JP] | Japan | 59-168539 |
| Aug. 24, 1984 | [JP] | Japan | 59-176299 |
| Oct. 3, 1984 | [JP] | Japan | 59-207545 |
| Oct. 3, 1984 | [JP] | Japan | 59-207546 |
| Oct. 3, 1984 | [JP] | Japan | 59-207547 |
| Oct. 18, 1984 | [JP] | Japan | 59-219090 |
| Jun. 25, 1985 | [JP] | Japan | 60-138200 |

[51] Int. Cl.⁴ .................................................. B60K 41/04
[52] U.S. Cl. .................................................. 74/866; 74/861
[58] Field of Search ............ 74/866, 740, 752 A, 74/752 D, 865, 856, 861, 863; 364/424.1

[56] References Cited

U.S. PATENT DOCUMENTS

| 4,252,148 | 2/1981 | Fochtman et al. | 74/866 |
| 4,312,248 | 1/1982 | Sugimoto et al. | 74/856 |
| 4,319,501 | 3/1982 | Sugimoto et al. | 74/856 X |
| 4,373,619 | 2/1983 | Schritt | 74/866 |
| 4,411,174 | 10/1983 | Yokoi et al. | 74/865 X |
| 4,474,082 | 10/1984 | Spokas et al. | 74/866 |
| 4,486,838 | 12/1984 | Itoh | 74/866 X |
| 4,506,752 | 3/1985 | Hara et al. | 74/866 X |
| 4,523,281 | 6/1985 | Noda et al. | 74/866 X |
| 4,584,906 | 4/1986 | Nagaoka et al. | 74/752 A |

FOREIGN PATENT DOCUMENTS

| 0126201 | 11/1984 | European Pat. Off. |
| 3025854 | 1/1981 | Fed. Rep. of Germany |
| 3101056 | 8/1982 | Fed. Rep. of Germany |
| 3142013 | 8/1982 | Fed. Rep. of Germany |
| 3214594 | 10/1982 | Fed. Rep. of Germany |
| 3227460 | 2/1983 | Fed. Rep. of Germany |
| 47-21562 | 10/1972 | Japan |
| 57-37140 | 3/1982 | Japan |

Primary Examiner—Lawrence Staab
Assistant Examiner—David Novais
Attorney, Agent, or Firm—Oblon, Fisher, Spivak, McClelland & Maier

[57] ABSTRACT

A method of controlling a transmission of a vehicle selectively either in a first mode of operation in such a manner that the transmission is shifted among a plurality of speed stages according to a first shift pattern, or in a second mode of operation in such a manner that the transmission is shifted among those speed stages which lacks at least one intermediate speed stage in the above-mentioned plurality of speed stages according to a second shift pattern, according selection between the above two modes of operation. On-off controlling of a lockup clutch is also changed in two modes according to the selection between the two modes of speed stage shifting, when it is incorporated in the transmission.

17 Claims, 14 Drawing Figures

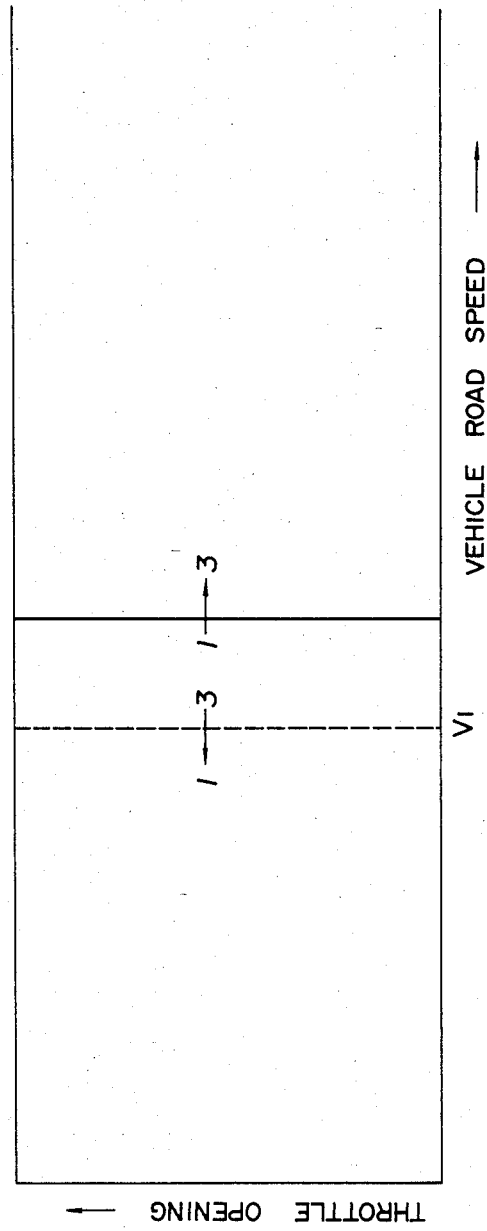

METHOD OF CONTROLLING A TRANSMISSION OF A VEHICLE IN TWO DIFFERENT MODES ACCORDING TO REQUIREMENTS FOR POWER AND ECONOMY

BACKGROUND OF THE INVENTION

1. Field of the Invention

The present invention relates to transmissions for vehicles, and more particularly to a method of controlling a transmission of a vehicle in two different modes according to requirements for the quality of control from the view point of power performance and economical performance of the vehicle.

2. Discussion of Prior Art

A transmission for a vehicle generally comprises a gear mechanism and selective engaging means such as friction clutches or one way clutches which selectivity rotationally connect two mutually rotational members in said gear mechanism and friction brakes or one way brakes which selectively brake a rotational member in said gear mechanism relative to a casing structure thereof, and provides selected one of a plurality of speed stages according to the engagement and disengagement of those engaging means. In an automatic transmission in which the engagement and disengagement of the engaging means are automatically controlled by a control means according to operational conditions of the vehicle, in acceleration of the vehicle from stoppage the transmission first provides 1st speed stage and is gradually successively shifted up to higher speed stages such as 2nd, 3rd, 4th and 5th speed stages generally according to the balance between vehicle road speed and throttle opening. It is already well known to apply a restriction to the automatic shifting of the transmission according to the balance between vehicle road speed and throttle opening in order to temporarily modify the performance of the automatic transmission so as to increase the power quality of the vehicle or to ensure better engine braking, by restricting upshifting to the 4th or the 5th speed stage, by shifting a speed shift lever shiftable by hand among D, S and L shift positions. However, in the conventional automatic transmissions for vehicles, regardless of such temporary restrictions to the shifting up of the gear transmission to the 4th speed stage or the 4th and 5th speed stages, the upshifting and the downshifting of the transmission are always performed through all intermediate speed stage or stages. However, when the vehicle is operated in a relatively moderate manner with no great demand for power quality under such a condition that not much load is carried by the vehicle, no great acceleration is required, the vehicle is operated in a region of no high altitude, the engine is operating with all of its cylinders, the engine is sufficiently warmed up, battery is in good charged condition, or the vehicle which incorporates a two wheel/four wheel drive changing over system is operated in two wheel drive mode, it would be possible to operate the vehicle in sufficiently good condition by shifting the transmission up to a higher speed stage directly from the start speed stage or a lower speed stage without passing through an intermediate speed stage so that the vehicle is more often operated at a higher speed stage with a smaller reduction gear ratio and therefore at a lower rotational speed of the engine thereby saving consumption of fuel.

SUMMARY OF THE INVENTION

It is therefore the primary object of the present invention to provide a method of controlling a transmission of a vehicle, said transmission comprising a gear mechanism for providing a first plurality of speed stages, the method being characterized in that said gear mechanism is shifted among said first plurality of speed stages according to a first shift pattern and among a second plurality of shift speed stages which lack at least one intermediate speed stage in said first plurality of speed stages according a second shift pattern according to selection between first and second modes of operation, respectively. The intermediate speed stage to be omitted in the operation of the transmission according to said second shift pattern may preferably be a second speed stage. When the gear mechanism is adapted to provide up to the 5th speed stage or a higher speed stage, said intermediate speed stage may be a 2nd speed stage and a 4th speed stage. Since the operation of the vehicle under the control of the transmission according to said second shift pattern will save consumption of fuel, this shift pattern for the transmission may be called an economical shift pattern, by contrast to said first shift pattern in which all speed stages are used, which may be called, in contrast, as a power shift pattern.

When the first and second shift patterns are expressed in a diagram having an abscissa coordinate for vehicle road speed and an ordinate coordinate for throttle opening, the spacing between each two adjacent speed stage shift lines along the abscissa in the second shift pattern is substantially the same as that in the first shift pattern, with the interval between a speed stage shift line for upshifting from the lowest speed stage to an adjacently higher speed stage and a speed stage shift line for upshifting to the highest speed stage from an adjacently lower speed stage in said second shift pattern being substantially smaller than that in said first shift pattern by an amount corresponding to the reduction of the number of the speed shift lines.

As supported by the above-mentioned basic concept of the present invention, another object of the present invention is to set out said first and second shift patterns in such a manner that, when said first and second shift patterns are expressed in a diagram by a coordinate of an abscissa for vehicle road speed and an ordinate for throttle opening, speed shift lines in said second shift pattern are totally generally biased toward smaller vehicle road speed side than the corresponding speed shift lines in said first shift pattern. By this arrangement, the vehicle operation according to said second shift pattern will become even more economical by a synergistic interrelation of the omission of an intermediate speed stage and the general shifting of the speed shift lines toward smaller vehicle road speed side than those in the conventional operation of the transmission. Alternatively, said second shift pattern may be so set out that it is substantially the same as said first shift pattern except that a speed shift line between a speed stage adjacent said intermediate speed stage on lower speed side thereof and said intermediate speed stage in said first shift pattern is converted into a speed shift line in said second shift pattern between said speed stage adjacent said intermediate speed stage on lower speed side thereof and a speed stage adjacent said intermediate speed stage on higher speed side thereof in said first shift pattern, and that a speed shift line between said intermediate speed shift stage and said speed stage adjacent said intermediate speed stage on higher speed side thereof in said first shift pattern is omitted in said second shift pattern.

As a further modification, the control of a transmission may be adapted to follow said second shift pattern when and only when throttle opening is smaller than a predetermined medium opening.

When a lockup clutch is incorporated in the transmission, the lockup clutch may desirably be controlled with regard to engagement and disengagement thereof in relation with the selection between said first and second shift patterns in order to cooperate with the control of the gear mechanism to place preference on power quality or economical quality of the vehicle. In accordance with this principle, on-off switching lines for the lockup clutch to be combined with said second shift pattern may desirably be biased toward smaller vehicle speed side than the corresponding on-off switching lines combined with said first shift pattern.

When the gear mechanism of a transmission controlled according to the method of the present invention comprises a first gear mechanism which provides two speed stages and a second gear mechanism which provides three speed stages, said first and second gear mechanisms being connected in series to one another, said gear mechanism providing a 1st speed stage when said first gear mechanism is in a lower speed stage thereof and said second gear mechanism is in a low speed stage thereof, a 2nd speed stage when said first gear mechanism is in a higher speed stage thereof and said 2nd gear mechanism is in said low speed stage thereof, a 3rd speed stage when said first gear mechanism is in said lower speed stage thereof and said second gear mechanism is in an intermediate speed stage thereof, a 4th speed stage when said first gear mechanism is in said lower speed stage thereof and said second gear mechanism is in a high speed stage thereof, and a 5th speed stage when said first gear mechanism is in said higher speed stage thereof and said second gear mechanism is in said high speed stage thereof, said intermediate speed stage of said transmission may preferably be said 2nd speed stage.

When the gear mechanism of a transmission controlled according to the method of the present invention comprises a first gear mechanism which provides two speed stages and a second gear mechanism which provides three speed stages, said first and second gear mechanisms being connected in series to one another, said gear mechanism providing a 1st speed stage when said first gear mechanism is in a lower speed stage thereof and said second gear mechanism is in a low speed stage thereof, a 2nd speed stage when said first gear mechanism is in a higher speed stage thereof and said second gear mechanism is in said low speed stage thereof, a 3rd speed stage when said first gear mechanism is in said lower speed stage thereof and said second gear mechanism is in an intermediate speed stage thereof, a 4th speed stage when said first gear mechanism is in said higher speed stage thereof and said second gear mechanism is in said intermediate speed stage thereof, a 5th speed stage when said first gear mechanism is in said lower speed stage thereof and said second gear mechanism is in a high speed stage thereof, and a 6th speed stage when said first gear mechanism is in said higher speed stage thereof and said second gear mechanism is in said high speed stage thereof, said intermediate speed stages of said transmission may be said 2nd speed stage and said 4th speed stage.

As described above, the selection of said second shift pattern which provides more economical advantage with preference placed thereon rather than placing preference on power quality of the vehicle should preferably be prohibited under some operating conditions of the vehicle. Such conditions may be selected from such conditions that load carried by the vehicle is equal to or larger than a predetermined weight value, a two wheel/four wheel drive mode switching over system is switched over to a four wheel drive mode, rate of increase of throttle opening on time base is equal to or larger than a predetermined value, altitude at which the vehicle is operated in equal to or larger than a predetermined height value, engine of the vehicle is operated in partial cylinder operation mode, engine temperature is equal to or lower than a predetermined warmed up temperature value, and battery charge condition is equal to or worse than a predetermined good condition.

BRIEF DESCRIPTION OF THE DRAWINGS

The present invention will now be described with respect to some preferred embodiments thereof and with reference to the illustrative drawings attached thereto. It should be clearly understood, whereby, that the description of the embodiments and the drawings are provided for the purpose of explanation and exemplification of the present invention, and are not intended to be limitative of the scope of the present invention, since this scope is to be delimited solely by the accompanying claims. In the figures:

FIG. 6 is an example of a diagram for "L" RANGE 3/1 FALL PATTERN;

DESCRIPTION OF THE PREFERRED EMBODIMENTS

Figure 1:
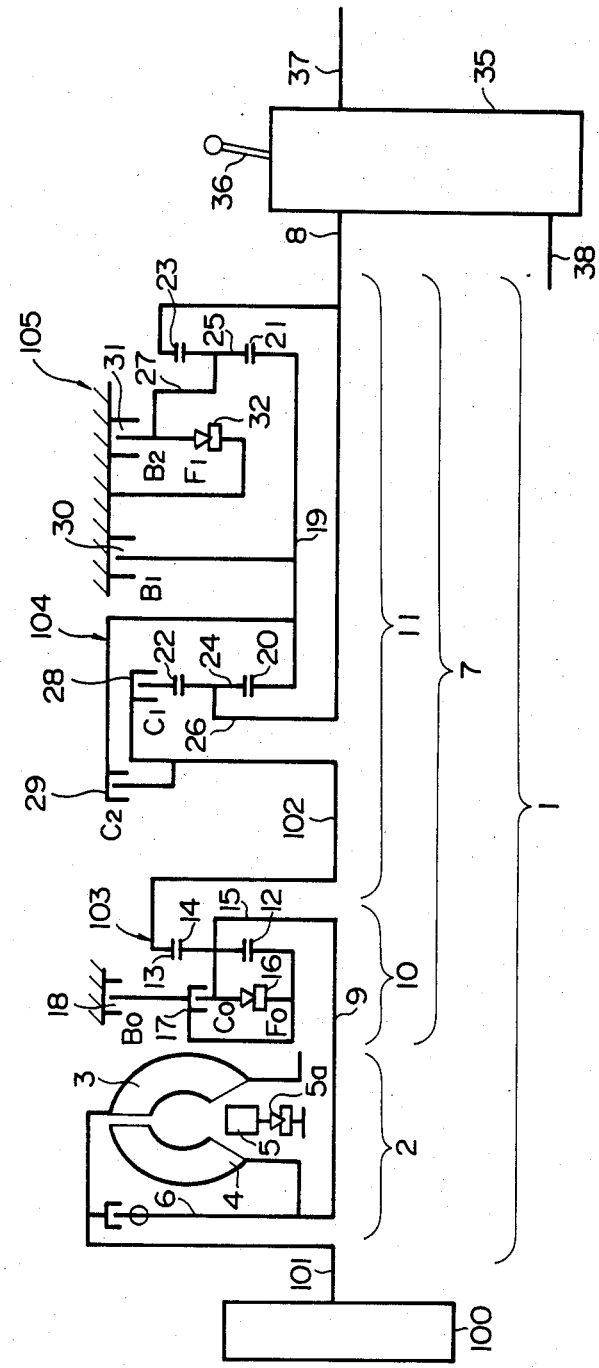
FIG. 1 is a schematic skeleton diagram showing an engine, the overall layout of the components of an automatic transmission, and a two wheel/four wheel drive mode changing over device, connected in series in said order.

The present invention will now be described with reference to the preferred embodiment thereof, and with reference to the figures. Referring to FIG. 1, a transmission designated by reference numeral 1 is shown as being powered by an internal combustion engine 100 via a shaft 101, and as transmitting output rotational power to a shaft 8 which, via a two wheel/- four wheel drive changing over device 35 which is changed over between a two wheel drive mode and a four wheel drive mode by a hand lever 36, transmits rotational power to a shaft 37 for driving rear wheels and a shaft 38 for driving front wheels. However, this two wheel/four wheel drive changing over device may be omitted according to a manner of embodying the present invention.

The transmission 1 comprises a fluid torque converter assembly 2 and a gear transmission mechanism 7. The fluid torque converter assembly 2 is supplied with rotational power via the power output shaft 101 of the engine 100 and outputs rotational power to a shaft 9 which functions as a power output shaft for the fluid torque converter assembly 2 and also as a power input shaft for the gear transmission mechanism 7.

The fluid torque converter assembly 2 is of a per se conventional three elements single stage type which comprises a pump impeller 3 rotationally connected to the power output shaft 101 of the engine 1, a turbine member 4 rotationally connected to the power output shaft 9, and a stator member 5 mounted via a one way clutch 5a to the casing of the fluid torque converter assembly 2, and further incorporates a lockup clutch 6 which selectively directly connects the pump impeller 3 and the turbine member 4.

The gear transmission mechanism 7 comprises an auxiliary gear transmission mechanism 10 and a main gear transmission mechanism 11. The auxiliary gear transmission mechanism 10 is supplied with rotational power via the power output shaft 9 of the fluid torque converter assembly 2 and outputs rotational power via a shaft 102 which functions as a power output shaft for the auxiliary gear transmission mechanism 10 and also as a power input shaft for the main gear transmission mechanism 11, and transmits rotational power therebetween.

The auxiliary gear transmission mechanism 10 is of the same general type as the overdrive device typically included in a conventional type of four speed automatic transmission with overdrive, and comprises a first planetary gear mechanism 103 which comprises a sun gear 12, a coaxially provided ring gear 13, and a carrier 15 which rotatably supports a plurality of planetary pinions 14 which are meshed with the sun gear 12 and the ring gear 13. The carrier 15 is rotationally connected to the power input shaft 9, and the ring gear 13 is rotationally connected to the power output shaft 102. A one way clutch F0 16 is provided for always rotationally connecting the carrier 15 to the sun gear 12 with respect to mutual rotation therebetween in one rotational direction only; a clutch C0 17 is provided for selectively rotationally connecting the carrier 15 to the sun gear 12 with respect to mutual rotation therebetween in both rotational directions; and a brake B0 18 is provided for selectively rotationally connecting the sun gear 12 to the casing of the auxiliary gear transmission mechanism 10 with respect to mutual rotation therebetween in both rotational directions. By selective engagement and disengagement of clutch C0 and brake B0, the auxiliay gear transmission mechanism 10 can be controlled to provide either of two gearing ratios or rotational speed stages between its power input shaft 9 and its power output shaft 102, in a manner which will be clear to one of ordinally skill in the art.

The main gear transmission mechanism 11 comprises second and third planetary gear mechanisms 104 and 105 which are arranged on the outside of a hollow intermediate shaft 19 which is coaxially fitted over the aforementioned power output shaft 8 of the main gear transmission mechanism 11. The second planetary gear mechanism 104 comprises a sun gear 20, a coaxially provided ring gear 22, and a carrier 26 which rotatably supports a plurality of planetary pinions 24 which are meshed with the sun gear 20 and the ring gear 22. The sun gear 20 is fixed on the left end in the figure of the intermediate shaft 19, and the carrier 26 is rotationally connected to the power output shaft 8. A clutch C1 28 is provided for selectively rotationally connecting the ring gear 22 to the power output shaft 102 of the auxiliary gear transmission mechanism 11, which may be also taken as a power input shaft of the main gear transmission mechanism 11, with respect to mutual rotation therebetween in both rotational directions. A clutch C2 29 is provided for selectively rotationally connecting said power input shaft 102 to the sun gear 20 and to the intermediate shaft 19 with respect to mutual relation therebetween in both rotational directions.

The third planetary gear mechanism 105 comprises a sun gear 21, a coaxially provided ring gear 23, and a carrier 27 which rotatably supports a plurality of planetary pinions 25 which are meshed with the sun gear 21 and the ring gear 23. The sun gear 21 is fixed on the right end in the figure of the intermediate shaft 19. The ring gear 23 is rotationally connected to the power output shaft 8. A brake B1 30 is provided for selectively rotationally connected the intermediate shaft 19 to the casing of the main gear transmission mechanism 11 with respect to mutual rotation therebetween in both rotational directions. A brake B2 31 is provided for selectively rotationally connecting the carrier 27 to said casing of the main gear transmission mechanism 11 with respect to mutual rotation therebetween in both rotational directions. A one way clutch F1 32 is provided for always rotationally connecting said carrier 27 to said casing of the main gear transmission mechanism 11 with respect to mutual rotation therebetween in one rotational direction only. By selective engagement and disengagement of clutches C1 and C2 and of brakes B1 and B2, the main gear transmission mechanism 11 can be controlled to provide any one of three forward gearing ratios or rotational speed stages and a reverse stage between its power input shaft 102 and its power output shaft 8, in a manner which will be clear to one of ordinally skill in the art.

The gear transmission mechanism 7 as a whole, as a combination of the auxiliary gear transmission mechanism 10 and the gear transmission mechanism 11, can be controlled, according to selective engagement and disengagement of the three clutches and of the three brakes, to provide any one of the maximum six forward gearing ratios or rotational speed stages including an overdrive speed stage and one reverse stage between its power input shaft 9 and its power output shaft 8. In the Table shown at the end of the description under the present subtitle, there is shown an embodiment of such selective combinations which, however, is selected to provide five forward gearing ratios or speed stages, in detail to give all shift schedules available by selection of "P", "R", "N", "D", "S" and "L" ranges. In the Table, an "O" in the column relating to a clutch or a brake indicates that the clutch or the brake is engaged, while an "X" relating to a clutch or a brake indicates that the clutch or the brake is disengaged; and an "O" in the column relating to a one way clutch indicates that the one way clutch is engaged so as to transmit rotational power when the engine 100 is powering the driven wheels of the vehicle via the automatic transmission system 1, while an "F" relating to a one way clutch indicates that the one way clutch is free wheeling or disengaged.

In the embodiment shown in the Table, when the automatic transmission 1 is being operated in the drive or "D" range, all five of its forward speed stages are available to be utilized, according to vehicle operational conditions as will be explained later; when the automatic transmission 1 is being operated in the second or "S" range, no upshifting to the 4th or the 5th stage is ever performed, and only the 1st through the 3rd speed stages are available to be utilized; and when the automatic transmission 1 is being operated in the low or "L" range, no upshifting to the 2nd, the 3rd, the 4th, or the 5th speed stage is ever performed in normal operation, and only the 1st speed stage is available to be utilized, provided that the 2nd speed stage or even the 3rd speed stage is performed as an intermediate stage in a manually forced downshifting from a higher speed stage to the 1st speed stage in order to avoid too high speed rotation of the engine. In general, each of the clutches and the brakes and the lockup clutch incorporated in the fluid torque converter is constructed as a hydraulically operated clutch or brake and is selectively engaged and disengaged by its hydraulic actuator system according to selective supply of hydraulic fluid pressure thereto.

With regard to the skeleton transmission diagram in FIG. 1 and the schedule of engagement and disengagement of the clutches and brakes shown in the Table, it will be noted that the auxiliary gear transmission mechanism 10 provides its directly connected stage when brake B0 is released and clutch C0 is engaged, while it provides its speed increasing stage when brake B0 is engaged and clutch C0 is released.

Figure 2:
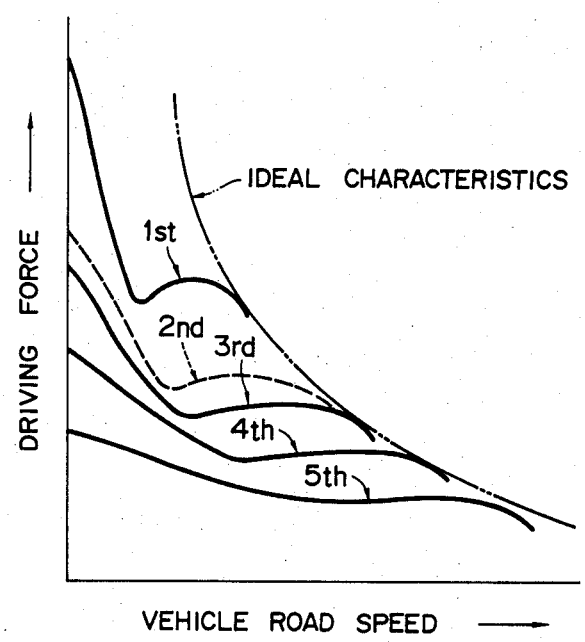
FIG. 2 is a diagram showing a relationship between vehicle road speed and driving force for various speed stages of the gear mechanism.

In the main transmission mechanism 11, when clutch C1 and clutch C2 are both engaged, it provides its high speed stage which is a directly connected speed stage, and in this condition of the main gear transmission mechanism 11 the auxiliary gear transmission mechanism is allowed to switch between its directly connected speed stage and its overdrive speed stage so as to provide the 4th speed stage and the 5th speed stage, respectively. When clutch C1 and brake B1 are engaged, the main gear transmission mechanism 11 provides its medium speed stage, and in this condition of the main transmission mechanism 11 the auxiliary gear transmission mechanism 10 is maintained in its directly connected stage so as to provide the 3rd speed stage. When clutch C1 only is engaged, and also with one way clutch F1 automatically being engaged, the main gear transmission mechanism 11 provides its low speed stage, and in this condition of the main gear transmission mechanism 11 the auxiliary gear transmission mechanism 10 is allowed to switch between its directly connected speed stage and its overdrive speed stage so as to provide the 1st speed stage and the 2nd speed stage, respectivey. In the 2nd speed stage in the "S" range and in the 2nd and the 1st speed stage in the "L" range, brake B2 is also engaged in order to connect the carrier 27 to the casing of the main gear transmission mechanism 11 with respect to mutual rotation therebetween in both rotational directions. As a design example, the reduction gear ratios of the low, intermediate and high speed stages of the main gear transmission 11 may be 2.826, 1.532 and 1.000, respectively, while the reduction gear ratio of the auxiliary gear transmission mechanism 10 may be 0.705. In this case, the reduction gear ratio of the 2nd speed stage is equal to 1.992. In FIG. 2, there is shown a relationship between the driving force and the vehicle road speed, for each of the various speed stages of the gear transmission mechanism 7, when the reduction gear ratios are exemplarily as mentioned above. In this figure, the ideal relationship is shown by a double dotted line, and it will be clear that by switching over the forward speed stage of the transmission mechanism 7 between these five speed stages as appropriate it is possible closely to approximate this ideal characteristic.

Figure 3:
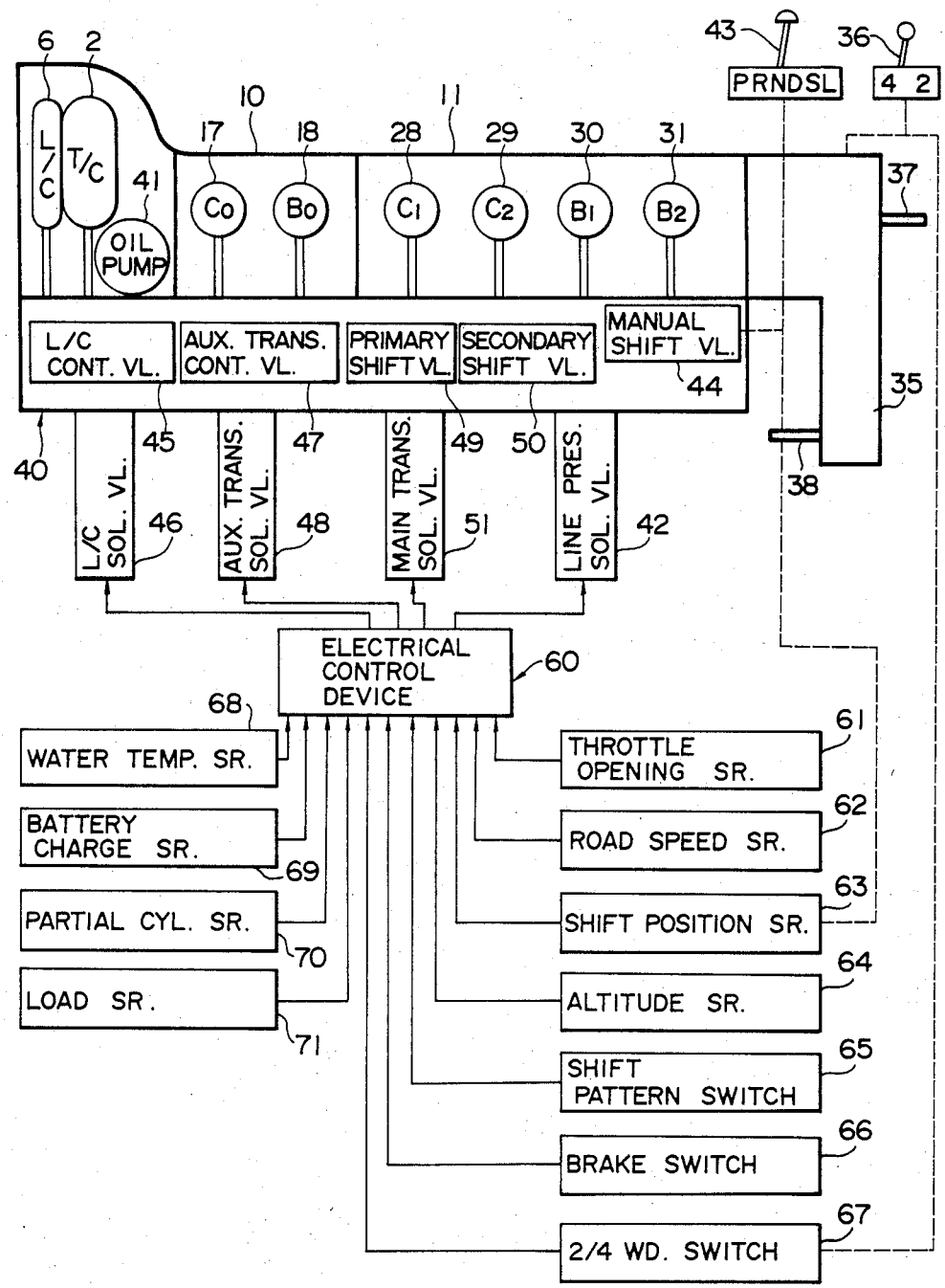
FIG. 3 is a schematic block diagram of the control system including various possible aspects of control which may be totally or partially applied to the control of the transmission according to the present invention.

FIG. 3 is a schematic block diagram of the control system including various possible aspects of control which may be totally or partially applied to the control of the transmission according to the present invention. In this figure, reference numeral 40 denotes the hydraulic portion of the control device, while 60 is a microcomputer. The hydraulic control device 40 comprises a hydraulic fluid (oil) pump 41 which picks up hydraulic fluid from a sump (not shown) and supplies it under pressure to a solenoid type line pressure regulation valve 42 which selectively bleeds off some of said pressurized hydraulic fluid back to the sump so as to produce a line pressure at its output side which is regulated according to the current operational conditions of the vehicle and the engine such as described hereinbelow by the duty ratio of an electrical pulse signal supplied to a solenoid incorporated in said valve 42 being varied by the microcomputer 60. An electrically controlled hydraulic fluid pressure control valve of this type is per se well known in the art. This line pressure its supplied to other components of the control system shown in FIG. 3.

Figure 4:
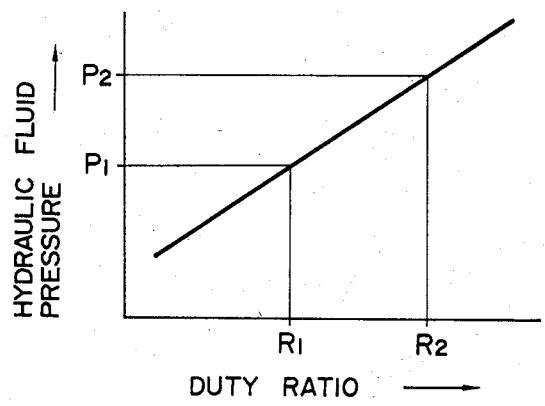
FIG. 4 is a diagram showing the operation of the hydraulic fluid control system based upon duty ratio of input pulse signal.

The control system further comprises: a manual shift valve 44 which is manually operated by the driver of the vehicle to select any optional shift position among "P", "R", "N", "D", "S" and "L" ranges; a lockup clutch control valve 45 which controls selective supply of actuaing hydraulic fluid pressure to the lockup clutch 6; a lockup clutch control solenoid valve 46 which controls switching over of the lockup clutch control valve 45; an auxiliary transmission control valve 47 which switches over the auxiliary gear transmission mechanism 10 by selectively either supplying hydraulic fluid pressure to clutch C0 and draining brake B0 or draining clutch C0 and supplying hydraulic fluid pressure to brake B0, an auxiliary transmission control solenoid valve 48 which controls the switching over of the auxiliary transmission control valve 47; a primary shift valve 49 and a secondary shift valve 50 which control in cooperation selective supply of actuating hydraulic fluid pressure and draining thereof to and from clutches C1 and C2 and brakes B1 and B2; and a main transmission control solenoid valve 51 which controls the switching over of said primary and secondary shift valves 49 and 50. All these control valves are per se known in the art and do not constitute any essence of the present invention. Particularly with regard to the combination of the primary and secondary shift valves 49 and 50 and the main transmission control solenoid valve 51, this combination is intended to generate such a hydraulic fluid pressure by the main transmission solenoid valve 51 that increases in accordance with the duty ratio of an electrical pulse signal supplied thereto from the electrical control device 60, as exemplarily shown in FIG.4, and to control the primary and secondary shift valves 49 and 50 by the varying hydraulic fluid pressure so as to establish either of the low, medium and high speed stages of the main gear transmission mechanism 11 according to the level of the hydraulic fluid pressure. Such a transmission control system is disclosed in Japanese Utility Model Publication No. 38186/83 and U.S. Pat. No. 4,252,148, which should be referred to for further details, if required.

The microcomputer 60 receives input signals from various sensor or switches which sense or indicate various operational conditions of the vehicle and/or the engine. In the diagram of FIG. 3 such sensors and switches that are usable for the control of the transmission according to the present invention are shown in parallel. However, it should be understood that all of these sensors and switches are not indispensable for executing the present invention in various embodiments and that some of them may be omitted in actual embodiments according to the balance between the quality requirements for the control and the cost required therefor. Such sensors and switches that may be useful to supply information for operating the electrical control device 60 are: a throttle opening sensor 61 which senses the position of a throttle valve (not shown) for the engine 100 of the vehicle and which produces an output signal representative of engine load; a road speed sensor 62 which produces an output signal representative of vehicle road speed; a shift pattern sensor 63 which senses the shift position among "P", "R", "N", "D", "S" and "L" ranges selected by the driver f the vehicle by the operation of a hand lever 43; an altitude sensor 64 which produces an output signal representative of the current altitude at which the vehicle incorporating this transmission is being operated; a shift pattern switch 65 which is operated by the driver of the vehicle to select a "P" pattern or an "E" pattern whichis described hereinunder; a brake switch 66 which produces an output signal representative of whether or not the brakes of the vehicle are being applied; a two wheel/four wheel drive change over switch 67 which produces an output signal representative of whether the vehicle is being operated in the two wheel drive mode or in the four wheel drive mode according to the setting of the hand lever 36 to be operated by the driver of the vehicle; a water temperature sensor 68 which produces an output signal indicative of the temperature of the cooling fluid of the internal combustion engine 100; a battery charge state sensor 69 which produces an output signal representative of the current stage of charge of the battery (not shown) of the vehicle; a partial cylinder operation sensor 70 which detects whether the internal combustion engine 100 is currently being operated in an all cylinder operational mode or in a partial cylinder operational mode in which some of the cylinders thereof are not being used and produces an output signal representative of this information; and a vehicle load sensor 71 which produces an output signal representative of the load carried by the vehicle. The microcomputer 60 executes a control program for setting the various clutches and brakes and the lockup clutch detailed above to be engaged or disengaged as well as for controlling the solenoid line pressure regulation valve 42.

Figure 5A:
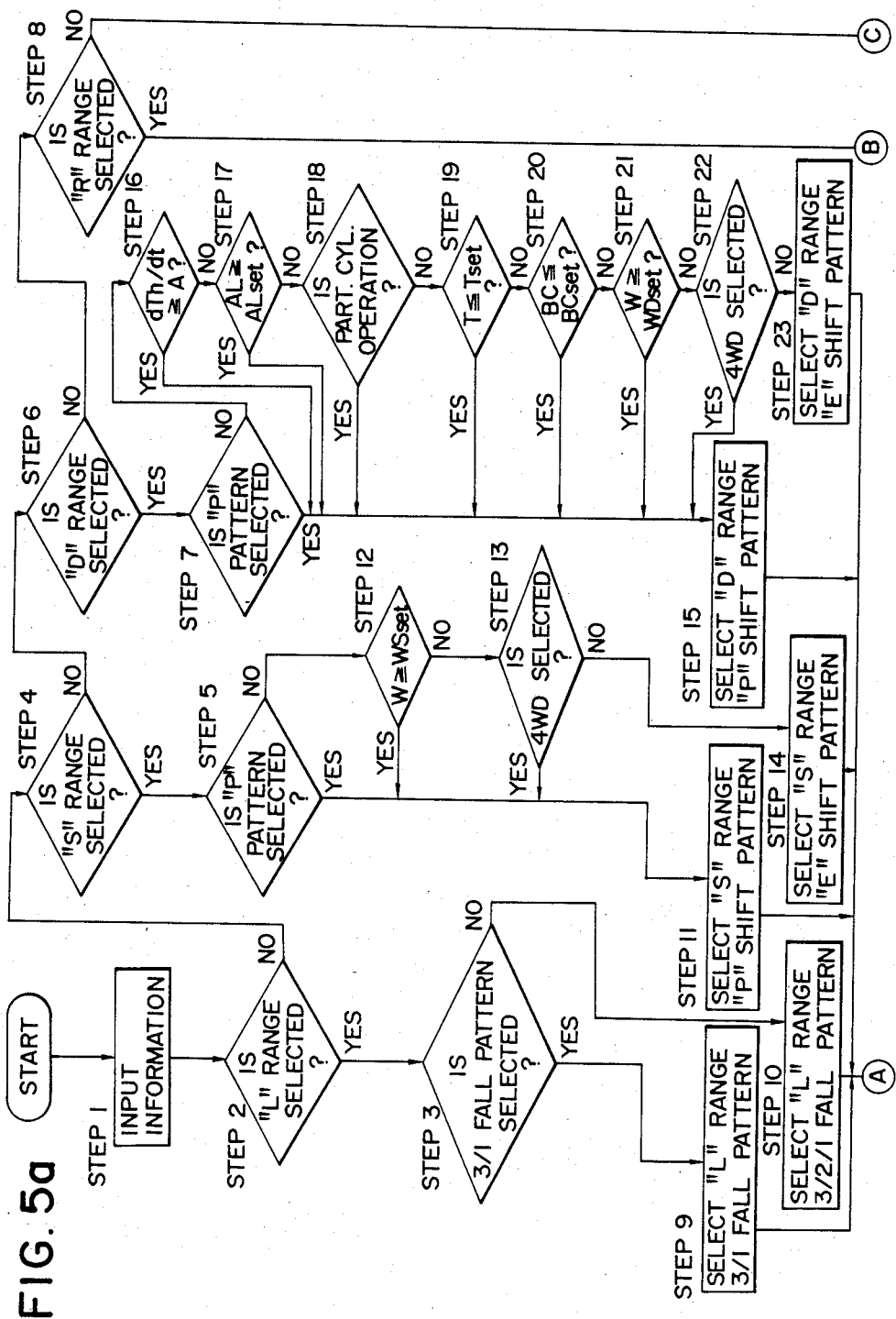
FIGS. 5a and 5b are half portions respectively of a flow chart of the program which is performed according to present invention for controlling the transmission system shown in FIGS. 1 and 3.
Figure 5B:
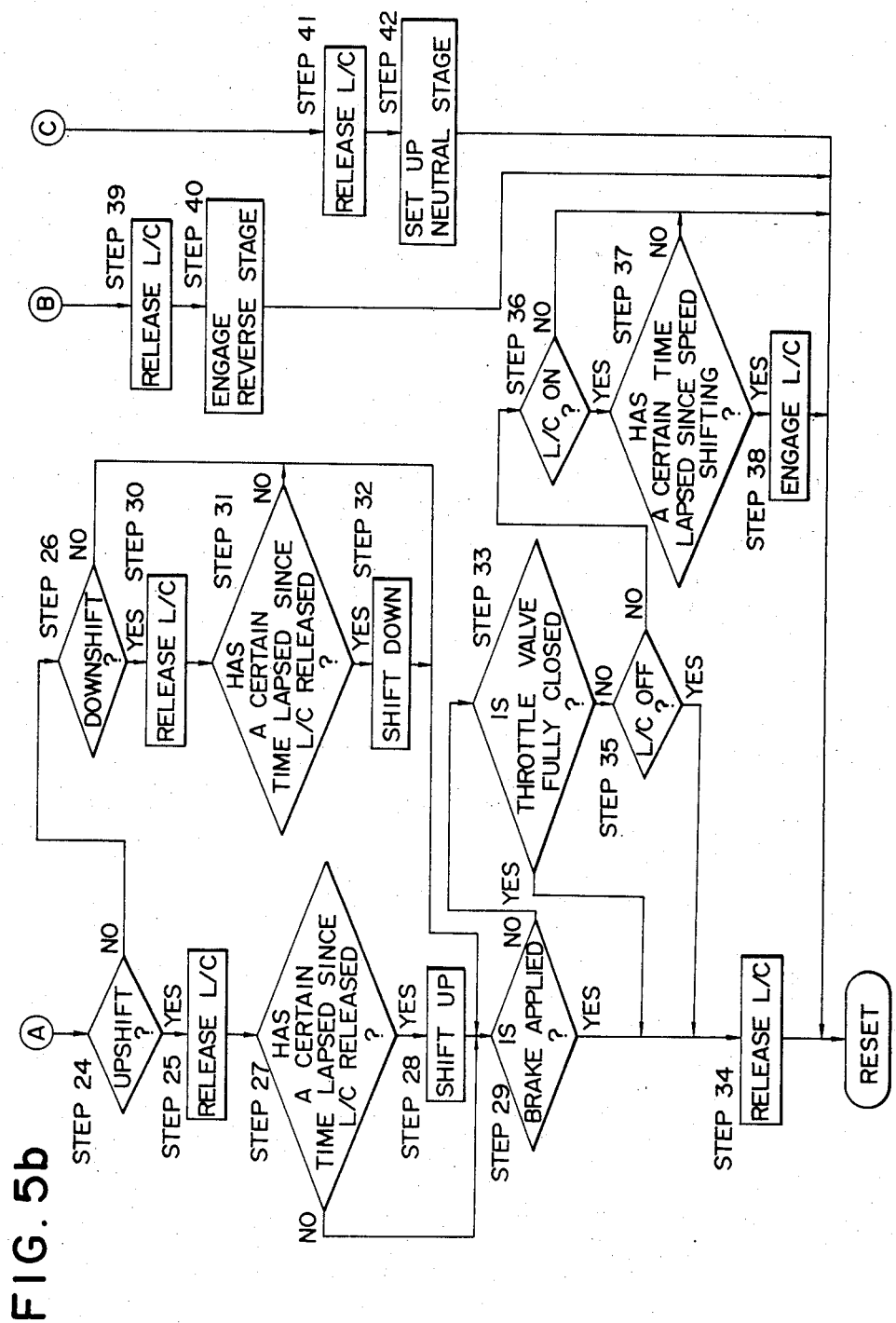

Referring to FIGS. 5a and 5b which are to be combined as connected at terminals A—A, B—B and C—C to show a flow chart of the program which is performed according to the present invention for controlling the transmission system shown in FIGS. 1 and 3, wherein the flow chart set out in FIGS. 5a and 5b includes various possible aspects of control which may be totally or partially adopted to practice the present invention into various actual embodiments. Therefore, it should be understood that all the steps herein shown are not essential for the constitution of the present invention. Again some steps in the diagram herein shown may be omitted in some actual embodiments of the present invention according to the balance between the requirements for the quality of control and the costs requires to be expended therefor. The routine through the flow chart is repeated at a predetermined time interval or at every predetermined progress of rotational angle of the crank shaft of the engine. After the start, at Step 1, the electrical control device 60 is supplied with input information from various sensors and switches as mentioned above.

In Step 2, it is checked if the shift range selected by the shift change lever 43 is "L" range. If the answer is YES, the process proceeds to Step 3, while if the answer is NO, the process proceeds to Step 4. In Step 4, it is checked if the shift range selected by the shift change lever is "S" range, and if the answer is YES, the process proceeds to Step 5, while if the answer is NO, the process proceeds to Step 6. In Step 6, it is checked if the shift range selected by the shift change lever is "D" range. If the answer is YES, the process proceeds to Step 7, while if the answer is NO, the process proceeds to Step 8.

Figure 7:
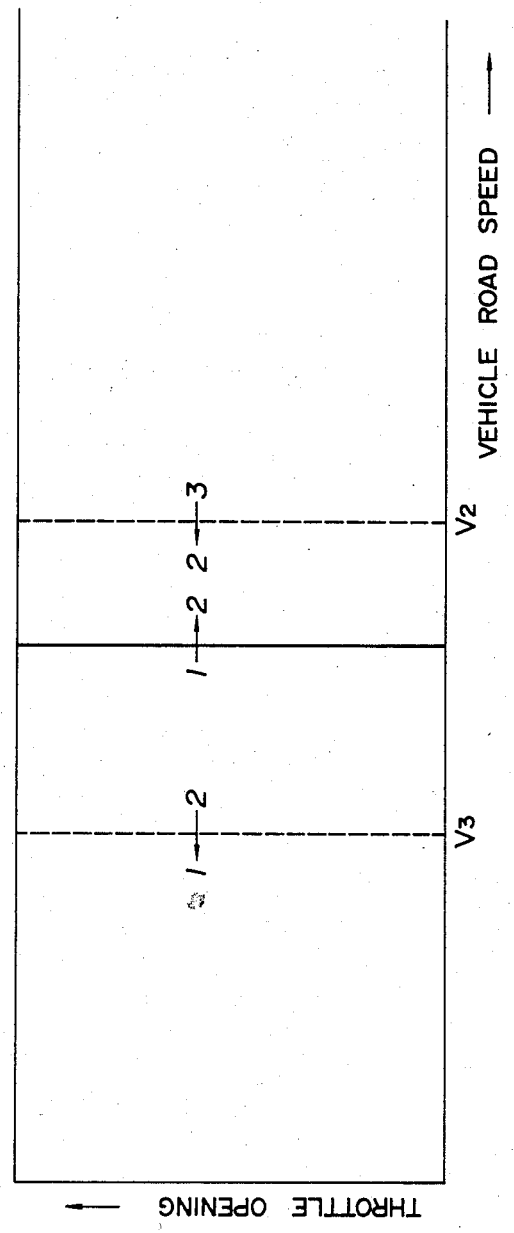
FIG. 7 is an example of a diagram for "L" RANGE 3/2/1 FALL PATTERN.

In Step 3, it is checked if 3/1 FALL PATTERN is selected. This selection is made by a manual switch (not shown or may be the shift pattern switch 65) adapted to be operated by the driver of the vehicle. If the answer is YES, the process proceeds to step 9, while if the answer is NO, the process proceeds to Step 10. In Step 9, an "L" RANGE 3/1 FALL PATTERN such as exemplarily shown in FIG. 6 is selected as a pattern according to which the transmission is controlled, while in Step 10 an "L" RANGE 3/2/1 FALL PATTERN such as exemplarily shown in FIG. 7 is selected as a pattern according to which the transmission is controlled. When the "L" RANGE 3/1 FALL PATTERN is selected when the transmission is operating at the 1st speed stage, no change of the operating speed stage occurs and the transmission is fixed at the 1st speed stage unless the rotational speed of the engine rises beyond a predetermined very high value above which there is a danger of damaging of the engine. When the transmission is operating at the 2nd or the 3rd speed stage when the "L" RANGE 3/1 FALL PATTERN is selected, the transmission is immediately shifted down to the 1st speed stage. In others words, if the transmission is operating at the 3rd speed stage when the "L" RANGE 3/1 FALL PATTERN is selected, the transmission is shifted down from the 3rd speed stage to the 1st speed stage without passing through the 2nd speed stage. In FIG. 6, the dotted line 3 to 1 (road speed V1) shows a downshift line for such downshifting in a diagram of road speed versus throttle opening. Further, in FIG. 6 a solid line 1 to 3 shows a shift line which causes upshifting of the transmission from the 1st speed stage to the 3rd speed stage which occurs only when the rotational speed of the engine exceeds the aforementioned high limit for the danger of engine damaging. This 3rd speed stage is shown in the Table in parentheses. Therefore, this solid line is not a so called shift line.

When the "L" RANGE 3/2/1 FALL PATTERN is selected when the transmission is operating at the 2nd speed stage, the transmission is shifted down from the 2nd speed stage to the 1st speed stage across a dotted line 2 to 1 (road speed V3). When the "L" RANGE 3/2/1 FALL PATTERN is selected when the engine is operating at the 3rd speed stage, the transmission is shifted down from the 3rd speed stage to the 2nd speed stage across a dotted line 3 to 2 (road speed V2), and then, as the road speed decreases from V2 to V3, the transmission is shifted down from the 2nd speed stage to the 1st speed stage across a dotted line 2 to 1. In FIG. 7, the solid line 1 to 2 is again a boarder across which the transmission is shifted up from the 1st speed stage to the 2nd speed stage when the rotational speed of the engine exceeds a predetermined high limit to avoid the danger of engine damaging. This 2nd speed stage is also shown in the Table in parentheses.

The combination of Steps 3, 9 and 10 is optional, and this combination may be replaced by a single step of directly proceeding from the YES terminal of Step 2 to Step 10 so that when the "L" RANGE is selected at Step 2, the "L" RANGE 3/2/1 FALL PATTERN is selected, so that shifting down to the 1st speed stage is successively performed from the 3rd speed stage to the 2nd speed stage and then from the 2nd speed stage to the 1st speed according to the diagram shown in FIG. 7.

Figure 8:
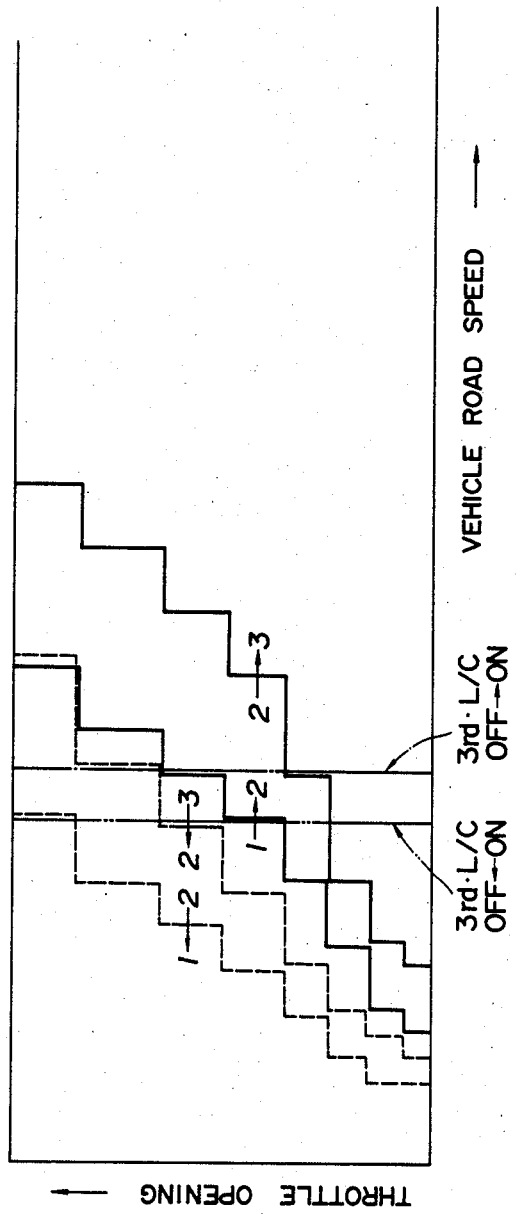
FIG. 8 is an example of a diagram for "S" RANGE "P" SHIFT PATTERN.

In Step 5, it is checked if a "P" PATTERN is selected by the aforementioned shift pattern switch 65, and if the answer is YES, the process proceeds to Step 11, while if the answer is NO, the process proceeds to Step 12. In Step 11, an "S" RANGE "P" SHIFT PATTERN such as exemplarily shown in FIG. 8 is selected as a pattern according to which the transmission is controlled. According to this "S" RANGE "P" SHIFT PATTERN, which is for power preference operation of the vehicle in the "S" RANGE, the transmission is shifted up from the 1st speed stage to the 2nd speed stage across a solid line 1 to 2 and from the 2nd speed stage to the 3rd speed stage across a solid shift line 2 to 3, while it is shifted down from the 3rd speed stage to the 2nd speed stage across a dotted shift line 3 to 2 and the 2nd speed stage to the 1st speed stage across a dotted shift line 2 to 1. Upshifting to the 4th speed stage is of course suppressed.

In Step 12, it is checked if the load W carried by the vehicle is equal to or larger than a predetermined weight value WSset for "S" range operation, and if the answer is YES, the process proceeds toward Step 11, and when the answer is NO, the process proceeds to Step 13. In Step 13, it is checked if the two wheel/four wheel drive changing over mechanism 35 is changed over to the four wheel driving mode, and if the answer is YES, the process proceeds toward Step 11, and when the answer is NO the process proceeds toward Step 14, where an "S" RANGE "E" SHIFT PATTERN, which is a shift pattern for operating the vehicle in an economical drive mode in the "S" range, is selected. Therefore, even when the "S" RANGE "E" SHIFT PATTERN is selected in Step 5 by the aforementioned pattern select switch 65 being turned to "E" position, the selection of pattern is directed to the "S" RANGE "P" SHIFT PATTERN if the load carried by the vehicle is equal to or larger than a predeterined weight value or if the 2/4 wheel drive changing over mechanism is shifted to the four wheel driving mode.

Figure 9:
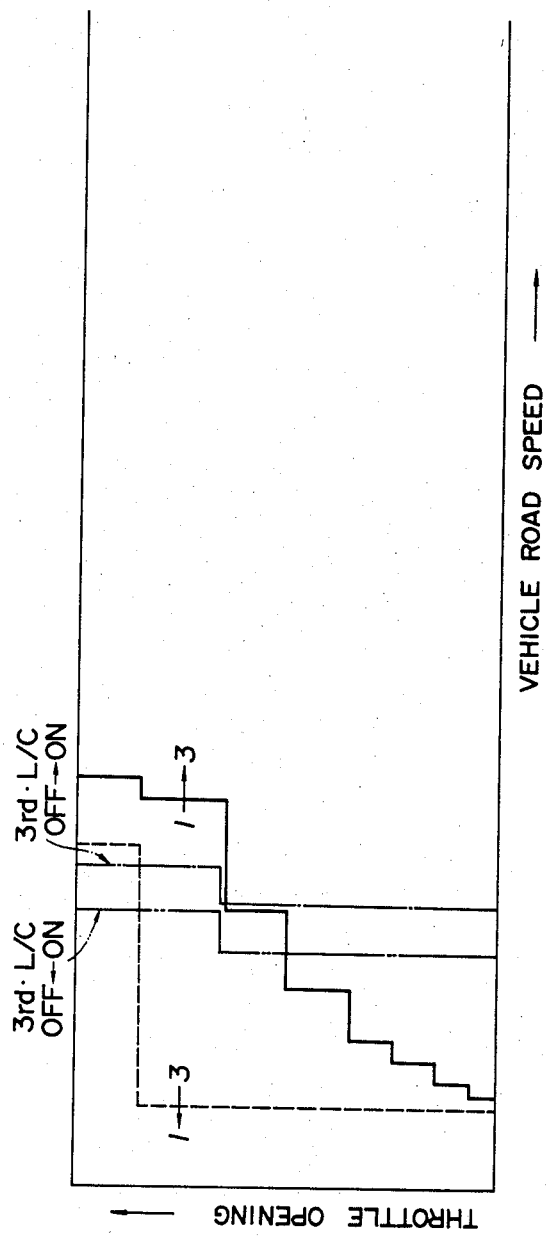
FIG. 9 is an example of a diagram for "S" RANGE "E" SHIFT PATTERN.

According to the "S" RANGE "E" SHIFT PATTERN, which is exemplarily shown in FIG. 9, the 2nd speed stage is omitted in upshifting as well as in downshifting, so that the transmission is shifted up from the 1st speed stage directly to the 3rd speed stage across a solid shift line 1 to 3 or the transmission is shifted down from the 3rd speed stage directly the 1st speed stage across a dotted shift line 3 to 1. By this arrangement the vehicle is operated in a greater part of its operation with smaller reduction gear ratio and lower rotational speed of the engine to save the consumption of fuel and to accomplish more economical operation of the vehicle. Further, as will be noted by comparison of the shift diagrams of FIGS. 8 and 9, the upshift line 1 to 3 in FIG. 9 is substantially biased toward the lower road speed side as compared with the upshift line 2 to 3 in FIG. 8, and the downshift line 3 to 1 in FIG. 9 is also substantially biased to the lower road speed side as compared with the downshift line 2 to 1 in FIG. 8.

The Step 12 of checking the load carried by the vehicle to change the selection of "E" PATTERN at Step 5 to the selection of "P" PATTERN when the load carried by the vehicle is equal to or larger than a predetermined weight value is optional and may be omitted. Also the Step 13 of checking whether the vehicle is being operated in the four wheel driving mode or in the two wheel driving mode to change the selection of "E" PATTERN at Step 5 to the selection of "P" PATTERN when the vehicle is operated in the four wheel driving mode is optional and may be omitted. When the two wheel/four wheel drive changing over mechanism 35 is not provided, this Step 13 is omitted as a matter of course.

Figure 10:
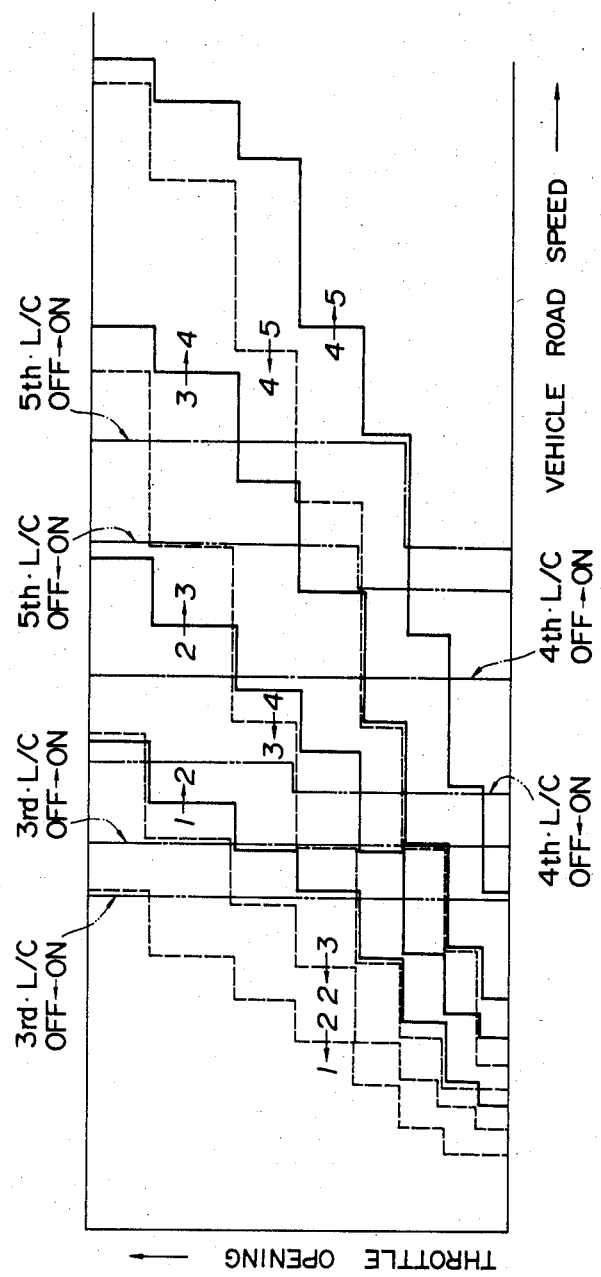
FIG. 10 is an example of a diagram for "D" RANGE "P" SHIFT PATTERN.

In Step 7, it is checked if the "P" PATTERN is selected by the aforementioned shift pattern switch 65 being switched over to the "P" position, and if the answer is YES, the process proceeds to Step 15, while if the answer is NO, the process proceeds to Step 16. In Step 15, a "D" RANGE "P" SHIFT PATTERN such as exemplarily shown in FIG. 10 is selected as a pattern according to which the transmission is controlled so that the vehicle is operated in a power preference mode in the "D" range. According to this shift pattern the transmission is successively shifted up as the vehicle road speed increases relative to the throttle opening from the 1st speed stage to the 2nd speed stage across a solid 1 to 2 upshift line, then from the 2nd speed stage to the 3rd speed stage across a solid 2 to 3 upshift line, then from the 3rd speed stage to the 4th speed stage across a solid 3 to 4 upshift line, and then finally from the 4th speed stage to the 5th speed stage across a solid 4 to 5 upshift line. In turn, as the vehicle road speed decreases relative to the throttle opening, the transmission is shifted down from the 5th speed stage to the 4th speed stage across a dotted 5 to 4 downshift line, then from the 4th speed stage to the 3rd speed stage across a dotted 4 to 3 downshift line, then from the 3rd speed stage to the 2nd speed stage across a dotted 3 to 2 downshift line, and then finally from the 2nd speed stage to the 1st speed stage across a dotted 2 to 1 downshift line.

In Step 16, it is checked if the rate of increasing of the throttle opening on time base dTh/dt is equal to or larger than a predetermined value A, and if the answer is YES the process proceeds toward Step 15, while if the answer is NO, the process proceeds to Step 17. In Step 17 it is checked if the altitude AL at which the vehicle is operated is equal to or higher than a predetermined altitude value ALset, and if the answer is YES, the process proceeds toward Step 15, while if the answer is NO, the process proceeds to Step 18. In Step 18, it is checked if the engine is operated in a partial cylinder operation mode in which one or more of the cylinders of a multi-cylinder engine are idling for the purpose of saving fuel consumption, and if the answer is YES, the process proceeds toward Step 15, while if the answer is NO, the process proceeds to Step 19. In Step 19, it is checked if a temperature T representing engine temperature is equal to or lower than a predetermined temperature Test which indicates that the engine is not in the sufficiently warmed up condition, and if the answer is YES, the process proceeds toward Step 15, while if the answer is NO, the process proceeds to Step 20. In Step 20, it is checked if the battery charge condition BC is equal to or lower than a predetermined condition BCset, which represents that the battery charge is in a good condition, the process proceeds toward Step 15, while if the answer is NO, the process proceeds to Step 21. In step 21, it is checked if the load W carried by the vehicle is equal to or larger than a predetermined weight value WDset for "D" range operation, and if the answer is YES, the process proceeds toward Step 15, while if the answer is NO, the process proceeds to Step 22. In Step 22, it is checked if the 2/4 wheel drive mode changing over mechanism 35 is changed over to the four wheel drive mode, and if the answer is YES, the process proceeds toward Step 15, while if the answer is NO, the process proceeds to Step 23.

The above Steps 16–22 are to check the above-mentioned various operating conditions of the vehicle and/or the engine from the view point that, even when the driver has selected the "E" pattern operation for the vehicle, whether such a selection is proper or not for the current operating condition of the vehicle and/or the engine, so as not to establish the "E" pattern operation, in spite of the selection by the driver thereof, and to change the selection of the "E" PATTERN to the selection of the "P" PATTERN. The Steps 16–22 are all optional in view of the essence of the present invention, and some or all of them may be omitted according to the consideration on the balance between the quality of operation of the automatic transmission and the costs required for the manufacture thereof. Further, the order of the Steps 16–22 in the shown embodiment is not essential. Even when those seven checking steps are employed, their orders may be changed according to the design principle, the use, the climate of the area of operation, and other conditions for the vehicles and/or the engine. Further, if the engine does not incorporate the system of partial cylinder operation, the checking thereof in Step 18 is omitted as a matter of course. Similarly, if the vehicle does not incorporate the system for selection between the two wheel driving and the four wheel driving mode, the checking thereof in Step 22 is also omitted as a matter of course.

Figure 11:
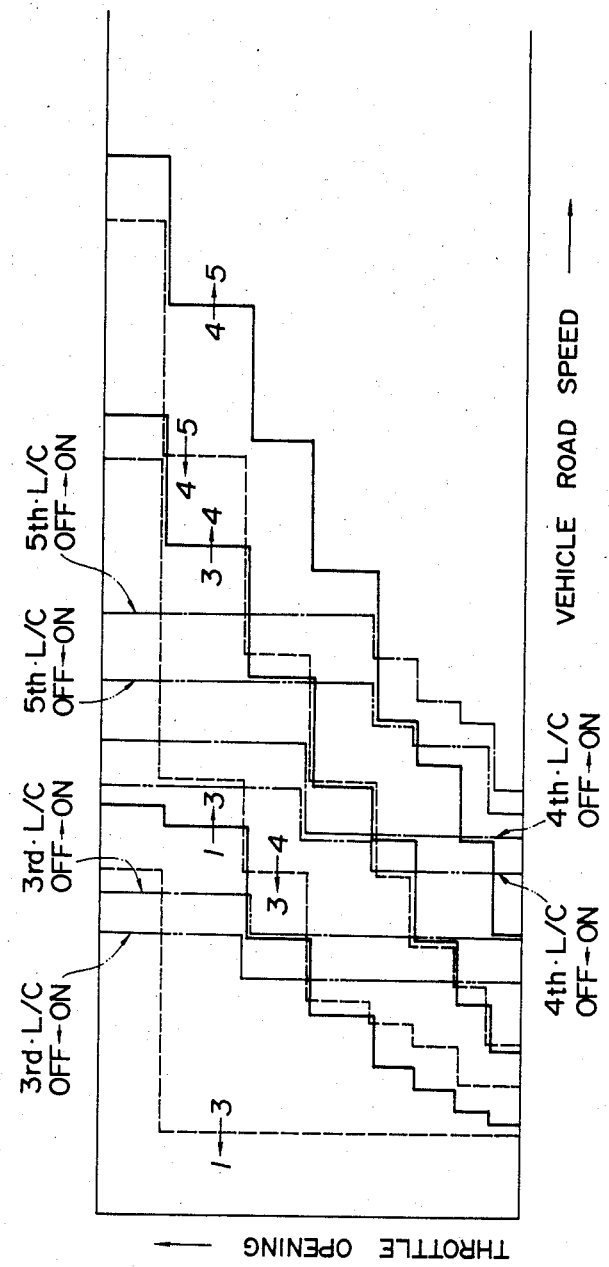
FIG. 11 is an example of diagram for "D" RANGE "E" SHIFT PATTERN.
Figure 12:
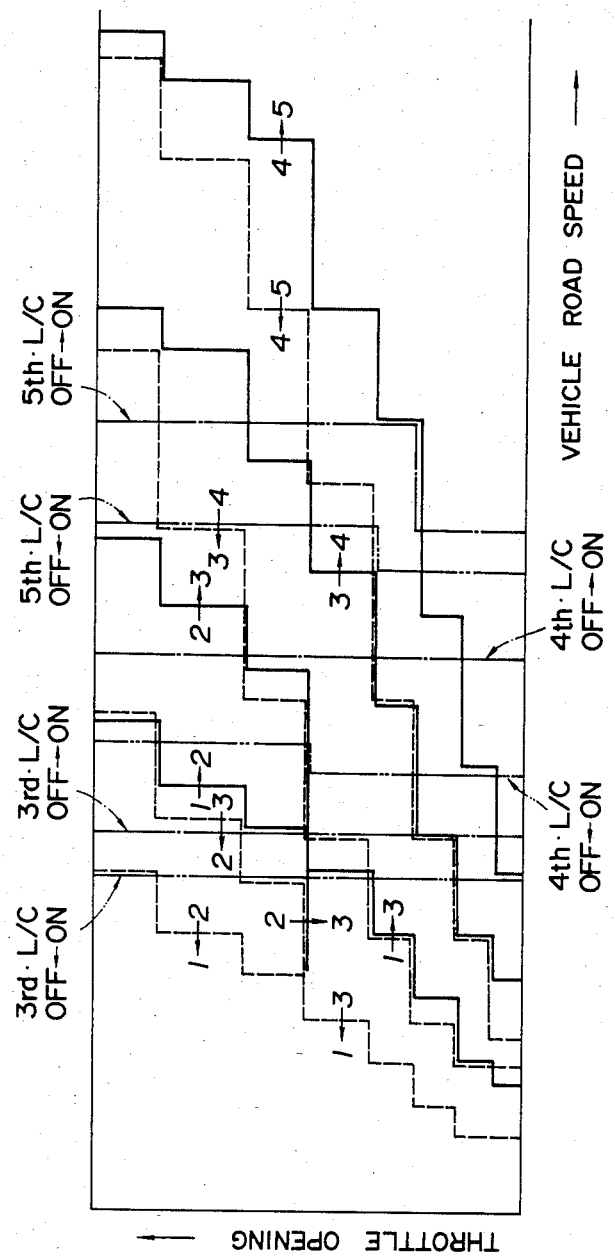
FIG. 12 is another example of a diagram for "D" RANGE "E" SHIFT PATTERN.

In Step 23, a "D" RANGE "E" SHIFT PATTERN such as exemplarily shown in FIG. 11 or in FIG. 12 is selected as a pattern of shifting according to which the transmission is shifted. In this "D" RANGE "E" SHIFT PATTERN, an intermediate speed stage such as the 2nd speed stage in the shown embodiment is omitted so that the transmission is operated at higher speed stages in larger part of the operational area thereof so that the vehicle is more economically operated with lower rotational speed of the engine and with less consumption of fuel. In the shift pattern shown in FIG. 11 the 2nd speed stage is completely omitted. In the shift pattern shown in FIG. 12 the 2nd speed stage is omitted in operation with the throttle opening less than a medium value. According to the shift pattern shown in FIG. 11, as the vehicle road speed increases relative to the throttle opening, the transmission is shifted up from the 1st speed stage directly to the 3rd speed stage across a solid 1 to 3 upshift line, then from the 3rd speed stage to the 4th speed stage across a solid 3 to 4 upshift line, and then finally from the 4th speed stage to the 5th speed stage across a solid 4 to 5 upshift line. In downshifting, as the vehicle road speed decreases relative to the throttle opening, the transmission is shifted down from the 5th speed stage to the 4th speed stage across a dotted 5 to 4 downshift line, then from the 4th speed stage to the 3rd speed stage across a dotted 4 to 3 downshift line, and finally from the 3rd speed stage directly to the 1st speed stage across a dotted 3 to 1 downshift line. Further, it will be noted by comparison of the shift patterns of FIG. 10 and FIG. 11 that the upshift and downshift lines in FIG. 11 is totally generally biased leftward in the figure toward the lower road speed side as compared with those in FIG. 10. By this arrangement, according to the "D" RANGE "E" SHIFT PATTERN the vehicle is operated in more part of its operation at higher speed stages than in the operation according to the "D" RANGE "P" SHIFT PATTERN so that the vehicle is operated in more economical mode with the engine being operated at lower rotational speed with less fuel consumption.

It can be appreciated from FIGS. 10 and 11 that the spacing between two adjacent speed stage shift lines is substantially the same in FIG. 11 as in FIG. 10, and that the spacing between the 1–3 upshifting shift line and the 4–5 upshifting shift line in FIG. 11 is substantially smaller than the spacing between the 1–2 upshifting shift line and the 4–5 upshifting shift line in FIG. 10. That is, upon the elimination of the second speed stage, the shift lines for the remaining speed stages have been moved closer together so that a large gap between the speed stages is avoided.

According to the "D" RANGE "E" SHIFT PATTERN shown in FIG. 12, when the vehicle is accelerated from the 1st speed stage with the throttle opening less than a predetermined medium opening, the transmission is shifted up from the 1st speed stage directly to the 3rd speed stage across a solid 1 to 3 upshift line. However, when the vehicle is accelerated from the 1st speed stage with the throttle opening equal to or larger than said predetermined medium opening, the transmission is shifted up from the 1st speed stage to the 2nd speed stage across a 1 to 2 upshift line, and then from the 2nd speed stage to the 3rd speed stage across a 2 to 3 upshift line. Further upshiftings from the 3rd speed stage to the 4th speed stage, from the 4th speed stage to the 5th speed stage are performed across a solid 3 to 4 upshift line and a solid 4 to 5 upshift line, respectively, for all region of the throttle opening. In downshifting, the transmission is shifted down from the 5th speed stage to the 4th speed stage across a dotted 5 to 4 downshift line, and then from the 4th speed stage to the 3rd speed stage across a dotted 4 to 3 downshift line, for all region of the throttle opening. When the vehicle is further decelerated so that the transmission is shifted down from the 3rd speed stage, if the throttle opening at that time is less than the abovementioned predetermined medium opening, it is shifted down from the 3rd speed stage directly to the 1st speed stage across a dotted 3 to 1 downshift line, whereas if the throttle opening at the time is equal to or larger than the aforementioned predetermined medium value, the transmission is shifted down from the 3rd speed stage to the 2nd speed stage across a dotted 3 to 2 downshift line, and then from the 2nd speed stage to the 1st speed stage across a dotted 2 to 1 downshift line. Further, in the embodiment shown in FIG. 12, an additional solid 2 to 3 upshift line is provided between the area of the 2nd speed stage shifted down from the 3rd speed stage at large throttle operation and the 3rd speed area shifted down from the 4th speed stage at small throttle opening, so as to upshift the transmission from the 2nd speed stage to the 3rd speed stage when the stepping on the accelerating pedal is soften at a road speed in this area. This additional upshift line is not absolutely necessary, but this ensures more economical operation of the vehicle intended by the "D" RANGE "E" SHIFT PATTERN. It will be noted by comparison of the shift patterns shown in FIGS. 10 and 12 that the upshift and downshift lines in FIG. 12 are generally the same except that the 1 to 2 upshift line and the 2 to 1 downshift line in FIG. 10 in the lower throttle opening area are changed to the 1 to 3 upshift line and the 3 to 1 downshift line with deletion of the 2 to 3 upshift line and the 3 to 2 downshift line, respectively, in this area in FIG. 10.

After either of the Steps 9, 10, 11, 14, 15 and 23 the process proceeds through terminal "A" to terminal "A" in FIG. 5b. In Step 8, it is checked if an "R" RANGE is selected, and if the answer is YES, the process proceeds through terminal "B" to terminal "B" in FIG. 5b, and if the answer is NO, the process proceeds through terminal "C" to terminal "C" in FIG. 5b.

Referring to FIG. 5b, in Step 24, it is checked if the current operating condition of the vehicle is on the right side of the upshift line from the current speed stage to the next higher speed stage in the shift pattern selected in the preceding pattern selecting process, as viewed in the shift pattern diagram, and if the answer is YES, the process proceeds to Step 25, while the if the answer is NO, the process proceeds to Step 26. In Step 25, the lockup clutch 6 is released, if the lockup clutch is in the engaged condition, and the process proceeds to Step 27. In Step 27, it is checked if a certain perdetermined time has lapsed since the lockup clutch was released, and if the answer is YES, the process proceeds to Step 28, in which the transmission is shifted up according to the shift pattern selected in the preceding shift pattern selecting procedure, and then the process proceeds to Step 29, while if the answer is NO, the process bypasses Step 28 and proceeds to Step 29.

In Step 26, it is checked if the current operating condition of the vehicle is on the left side of the downshift line from the current speed stage to the next lower speed stage in the diagram of the shift pattern selected in the preceeding pattern selecting process, and if the answer is YES, the process proceeds to Step 30, in which the lockup clutch 6 is released if it is in the engaged condition, and then the process proceeds to Step 31, in which it is checked if a predetermined certain time has lapsed since the lockup clutch was released, and if the answer is YES, the process proceeds to Step 32, in which the transmission is shifted down, while if the answer in Step 26 is NO, or the answer in Step 31 is NO, the process bypasses the upshifting Step 32 and proceeds toward Step 29.

In Step 29, it is checked if the braking action is applied to the vehicle by the driver, and if the answer is YES, the process proceeds to Step 34, in which the lockup clutch is released, and then the process proceeds toward RESET, while if the answer is NO, the process proceeds to Step 33, in which it is checked if the throttle valve is fully closed, and if the answer is YES, the process proceeds toward Step 35, while if the answer is NO, the process proceeds to Step 35.

In Step 35, the shift pattern selected in the preceding shift pattern selecting procedure in Step 9, 10, 11, 14, 15 or 23 is again referred to. In the shift pattern diagrams for the "S" and "D" RANGE operations shown in FIGS. 8-12, the boarders for controlling the lockup clutch 6 between the engaged and disengaged conditions thereof are included as shown by one and two dotted lines, respectively, such a 3rd L/C OFF to ON, 3rd L/C ON to OFF, 4th L/C OFF to ON, 4th L/C ON to OFF, 5th L/C OFF to ON and 5th L/C ON to OFF, wherein one dotted line 3rd L/C OFF to ON indicates a boarder which shows that when the vehicle operating condition with regard to the vehicle road speed versus the throttle opening changes across the line from the left side thereof to the right side thereof in the figure in the 3rd speed operation, the lockup clutch is to be engaged, while the double dotted line 3rd L/C ON to OFF indicates a boarder which shows that when the vehicle operating condition changes from the right side thereof from the left side thereof in the figure in the 3rd speed stage operation, the lockup clutch is to be disengaged, and the like. In this Step 35, by referring to one of these shift pattern diagrams selected in the preceding shift pattern selecting procedure, it is checked if the current operating condition of the vehicle as viewed at a point in the shift pattern diagram is on the left side of the L/C ON to OFF line (except in "L" range operation), and if the answer is YES, the process proceeds to step 34, in which the lockup clutch 6 is disengaged, and the process proceeds to RESET, while if the answer is NO, the process proceeds to Step 36.

In Step 36, by referring to the shift pattern diagram selected in the preceding shift pattern selecting procedure it is checked if the current operating condition of the vehicle as view at a point in the shift pattern diagram is on the right side of the L/C OFF to ON line (except in "L" range operation), and if the answer is YES, the process proceeds to Step 37, while if the answer is NO, the process proceeds toward RESET. In Step 37, it is checked if a certain predetermined time has lasped since the speed stage was shifted, and if the answer is YES, the process proceeds to Step 38, and the lockup clutch is engged, and then process proceeds to RESET.

When the process proceeds through terminal "B", in Step 39 the lockup clutch is released, and then in Step 40 the transmission is shifted to the reverse stage, and then the process proceeds toward RESET. When the process proceeds through terminal "C", in Step 41 the lockup clutch is released, and then in Step 42 the transmission is shifted to the neutral stage, and then the process proceeds toward RESET.

It will be apparent that the above-mentioned Steps 25, 27, 30, 31, 33, 34, 35, 36, 37, 38, 39 and 41 are not required when the torque converter 2 is of the type incorporating no lockup clutch.

Figure 13:
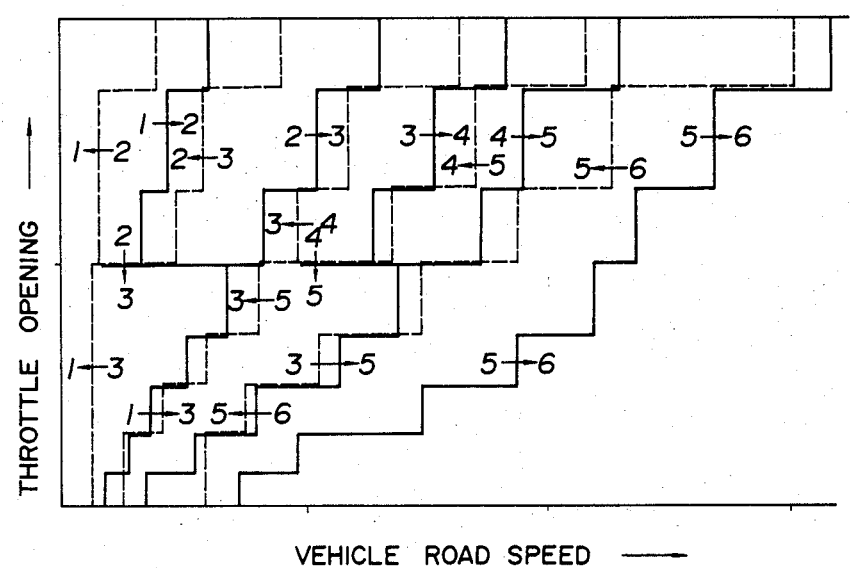
FIG. 13 is still another example of a diagram for "E" SHIFT PATTERN.

FIG. 13 shows still another example of a speed shift pattern of the same type as that shown in FIG. 12, which is applicable to a gear mechanism which comprises a first gear mechanism which provides two speed stages and a second gear mechanism which provides three speed stages, said first and second gear mechanisms being connected in series to one another, said gear mechanism providing a 1st speed stage when said first gear mechanism is in a lower speed stage thereof and said second gear mechanism is in a low speed stage thereof, a 2nd speed stage when said first gear mechanism is in a higher speed stage thereof and said second gear mechanism is in said low speed stage thereof, a 3rd speed stage when said first gear mechanism is in said lower speed stage thereof and said second gear mechanism is in an intermediate speed stage thereof, a 4th speed stage when said first gear mechanism is in said higher speed stage thereof and said second gear mechanism is in said intermediate speed stage thereof, a 5th speed stage when said first gear mechanism is in said lower speed stage thereof and said second gear mechanism is in a high speed stage thereof, and a 6th speed stage when said first gear mechanism is in said higher speed stage thereof and said second gear mechanism is in said high speed stage thereof.

In this speed shift pattern, in the lower half operational area for lower throttle opening as viewed in the diagram of shift pattern the use of the 2nd and the 4th speed stages are omitted so that speed stage shifting is performed between the 1st speed stage and the 3rd speed stage, the 3rd speed stage and the 5th speed stage, and the 5th speed stage and the 6th speed stage. The operation of the transmission having six speed stages as described above will be apparent to one of ordinary skill in the art in view of the above descriptions with reference to FIG. 12, and therefore further descriptions about this embodiment will be omitted for the brevity of the specification.

Although the invention has been described with reference to several embodiments thereof which incorporate various possible aspects of control, it will be apparent for those skilled in art that the present invention is not limited to the shown embodiment and various modifications thereof including omission of one or more of the mechanical constructions and/or the control steps incorporated in the shown embodiment would be readily possible without departing from and substantially losing the merits of the present invention.

TABLE

|  |  | C1 28 | C2 29 | C0 17 | B1 30 | B2 31 | B0 18 | F1 32 | F0 16 |
|---|---|---|---|---|---|---|---|---|---|
| P RANGE |  |  | X | X | O | X | X | X | F | F |
| R RANGE |  |  | X | O | O | X | O | X | F | F |
| N RANGE |  |  | X | X | O | X | X | X | F | F |
| D RANGE | 1ST | O | X | O | X | X | X | O | O |
|  | 2ND | O | X | X | X | X | O | O | F |
|  | 3RD | O | X | O | O | X | X | F | O |
|  | 4TH | O | O | O | X | X | X | F | O |
|  | 5TH | O | O | X | X | X | O | F | F |
| S RANGE | 1ST | O | X | O | X | X | X | O | O |
|  | 2ND | O | X | X | X | O | O | O | F |
|  | 3RD | O | X | O | O | X | X | F | O |
| L RANGE | 1ST | O | X | O | X | X | X | O | O |
|  | (2ND | O | X | X | X | O | O | O | F) |
|  | (3RD | O | X | O | O | X | X | F | O) |

What is claimed is:

1. A method of controlling a transmission of a vehicle, said transmission comprising a gear mechanism for providing a series of more than two speed stages having gradually decreasing reduction gear ratios from a lowest speed stage of a largest reduction gear ratio to a highest speed stage of a smallest reduction gear ratio, comprising the steps of:

detecting a driver's operation of the vehicle to discriminate between the driver's intention to drive the vehicle with a preference for power and a preference for economy performance, shifting said gear mechanism in a first mode among said series of speed stages according to a first shift pattern suitable for powerful operation of the vehicle when the discriminated driver's intention is to drive the vehicle with preference on power performance, and shifting said gear mechanism in a second mode among a sub-series of speed stages which lacks at least one intermediate speed stage in said series of speed stages according to a second shift pattern suitable for economical operation of the vehicle when the discriminated driver's intention is to drive the vehicle with preference on economy performance, wherein, when said first and second shift patterns are expressed in a diagram having an abscissa coordinate for vehicle road speed and an ordinate coordinate for throttle opening, the spacing between each two adjacent speed stage shift lines along the abscissa in said second shift pattern is substantially the same as that in said first shift pattern, with the interval between a speed stage shift line for upshifting from the lowest speed stage to an adjacently higher speed stage and a speed stage shift line for upshifting to the highest speed stage from an adjacently lower speed stage in said second shift pattern being substantially smaller than that in said first shift pattern by an amount corresponding to the reduction of the number of the speed shift lines.

2. A method according to claim 1, wherein said intermediate speed stage is a 2nd speed stage.

3. A method according to claim 1, wherein said intermediate speed stages are a 2nd speed stage and a 4th speed stage.

4. A method according to claim 1, wherein said transmission is shifted according to said second shift pattern when and only when throttle opening is smaller than a predetermined medium opening.

5. A method according to claim 1, wherein said transmission further comprises a lockup clutch, said lockup clutch being engaged and disengaged according a first on-off pattern when said gear mechanism is shifted according to said first shift pattern and according to a second on-off pattern when said gear mechanism is shifted according to said second shift pattern, respectively.

6. A method according to claim 5, wherein said first on-off pattern is an on-off pattern for controlling said lockup clutch with more preference being placed on power quality of the vehicle than on economical quality of the vehicle, and said second on-off pattern is an on-off pattern for controlling said lockup clutch with more preference being placed on economical quality of the vehicle than on power quality of the vehicle.

7. A method according to claim 6, wherein when said first and second on-off patterns are expressed in a diagram having an abscissa coordinate for vehicle road speed and an ordinate coordinate for throttle opening, on-off switching lines between engagement and disengagement of said lockup clutch in said second on-off pattern being totally generally biased toward a smaller vehicle speed side than the corresponding on-off switching lines in said first on-off pattern.

8. A method according to claim 1, wherein said gear mechanism comprises a first gear mechanism which provides two speed stages and a second gear mechanism which provides three speed stages, said first and second gear mechanisms being connected in series to one another, said gear mechanism providing a 1st speed stage when said first gear mechanism is in a lower speed stage thereof and said second gear mechanism is in a low speed stage thereof, a 2nd speed stage when said first gear mechanism is in a higher speed stage thereof and said 2nd gear mechanism is in said low speed stage thereof, a 3rd speed stage when said first gear mechanism is in said lower speed stage thereof and said second gear mechanism is in an intermediate speed stage thereof, a 4th speed stage when said first gear mechanism is in said lower speed stage thereof and said second gear mechanism is in a high speed stage thereof, and a 5th speed stage when said first gear mechanism is in said higher speed stage thereof and said second gear mechanism is in said high speed stage thereof.

9. A method according to claim 8, wherein said intermediate speed stage of said transmission is said 2nd speed stage.

10. A method according to claim 1, wherein said gear mechanism comprises a first gear mechanism which provides two speed stages and a second gear mechanism which provides three speed stages, said first and second gear mechanisms being connected in series to one another, said gear mechanism providing a 1st speed stage when said first gear mechanism is in a lower speed stage thereof and said second gear mechanism is in a low speed stage thereof, a 2nd speed stage when said first gear mechanism is in a higher speed stage thereof and said second gear mechanism is in said low speed stage thereof, a 3rd speed stage when said first gear mechanism is in said lower speed stage thereof and said second gear mechanism is in an intermediate speed stage thereof, a 4th speed stage when said first gear mechanism is in said higher speed stage thereof and said second gear mechanism is in said intermediate speed stage thereof, a 5th speed stage when said first gear mechanism is in said lower speed stage thereof and said second gear mechanism is in a high speed stage thereof, and a 6th speed stage when said first gear mechanism is in said higher speed stage thereof and said second gear mechanism is in said high speed stage thereof.

11. A method according to claim 10, wherein said intermediate speed stages of said transmission are said 2nd speed stage and said 4th speed stage.

12. A method according to claim 1 including the step of overcoming said discriminated driving intention and automatically selecting said first shift pattern when any one of such conditions is met that a load carried by the vehicle is equal to or larger than a predetermined weight value, a two wheel/four wheel drive mode switching over system is switched over to a four wheel drive mode, rate per unit time of increase of throttle opening is equal to or larger than a predetermined value, an altitude at which the vehicle is operated is equal to or larger than a predetermined altitude value, an engine of the vehicle is operated in partical cylinder operation mode, an engine temperature is equal to or lower than a predetermined warmed up temperature value, and a battery charge condition is equal to or worse than a predetermined good condition.

13. A method according to claim 1, wherein the selection between said first and second modes is made by manual operation of a shift pattern switch.

14. A method according to claim 1, wherein said intermediate speed stage is a speed stage at which engine brake is effected when either "S" range or "L" range is manually selected as a shift schedule.

15. A method according to claim 1, wherein said first mode is selected when a two wheel/four wheel drive mode switching over system is switched over to a four wheel drive mode.

16. A method according to claim 1, wherein said first mode is selected when rate per unit time of increase of throttle opening is equal to or larger than a predetermined value.

17. A method according to claim 1, wherein said first mode is selected when an engine of the vehicle is operated in partial cylinder operation mode.

* * * * *